United States Patent Office 2,892,803
Patented June 30, 1959

2,892,803

COMPOSITION COMPRISING NITRILO METHYLOL-PHOSPHORUS-POLYMER AND ORGANIC TEXTILES FLAME-PROOFED THEREWITH

Wilson A. Reeves and John D. Guthrie, New Orleans, La., assignors to the United States of America as represented by the Secretary of Agriculture No Drawing. Application September 29, 1955
Serial No. 537,596

12 Claims. (Cl. 260—29.2)

(Granted under Title 35, U.S. Code (1952), sec. 266)

A non-exclusive, irrevocable, royalty-free license in the invention herein described throughout the world for all purposes of the United States Government with the power to grant sublicenses for such purposes, is hereby granted to the Government of the United States of America.

This invention relates to reducing the flammability of organic textiles by impregnating them with nitrilo methylol-phosphorus polymers. More particularly, this invention provides a method of increasing certain aspects of the efficiency of such textile flammability reducing polymers without the incorporation of halogen-containing materials.

Prior work has resulted in the development of a variety of polymers capable of being produced by condensation and/or esterification reactions involving tetrakis(hydroxymethyl) phosphonium chloride, which has the formula $(HOCH_2)_4PCl$, and is abbreviated THPC, and/or tris-(hydroxymethyl) phosphine oxide, which has the formula $(HOCH_2)_3PO$, and is abbreviated THPO. The methylol-phosphorus ($PCH_2OH$) groups of each of these compounds are capable of either: (1) condensing with a compound which is capable of condensing with formaldehyde; or, (2) being esterified by an esterifying agent which is capable of esterifying methanol. Compounds of the group, THPC, THPO, and derivatives of either of them which contain a plurality of methylol-phosphorus groups of the parent compounds, are hereinafter referred to by the term "phosphorus compounds."

The polymers capable of being produced by condensation and/or esterification reactions of the phosphorus compounds can be produced in the form of cross-linked polymers or thermosetting resins; and, hereinafter, these polymers are referred to by the term "methylol-phosphorus" polymers or resins. The compounds capable of either condensing with formaldehyde or esterifying methanol are hereinafter referred to by the term "methylol-reactive compounds."

The methylol-phosphorus polymers are characterized by recurring structural units containing phosphorus atoms in radicals of the group $(-CH_2)_4PCl$ and $(-CH_2)_3PO$. Methylol-phosphorus alkyds are produced by reacting at least one of the phosphorus compounds with at least one polycarboxylic acid esterifying agent. Phenolic methylol-phosphorus polymers are produced by reacting at least one of the phosphorus compounds with at least one phenolic compound.

Certain nitrogen containing methylol-phosphorus polymers, which are hereinafter referred to as "nitrilo" methylol-phosphorus polymers or resins, are particularly useful as textile flammability retardants. These resins are adapted to being partly or completely formed within the textile; by impregnating the textile with an aqueous solution or dispersion of their resin forming reactants, and causing the reactants to react in situ until an insolubilized resin is produced. The nitrilo methylol-phosphorus polymers are capable of being produced by condensing at least one of the phosphorus compounds, with the elimination of water, with at least one organic nitrogen compound having a molecular weight of not more than about 800 and containing at least one trivalent nitrogen atom and at least two members of the group II and $CH_2OH$ attached to trivalent nitrogen atoms. This class of organic nitrogen compounds is hereinafter referred to by the term "nitrogen compounds." Methods of producing the nitrilo methylol-phosphorus polymers and employing them to reduce the flammability of textiles are more completely described in copending patent applications, Serial No. 378,437, filed September 3, 1953, now Patent No. 2,809,941; Serial No. 393,021 and Serial No. 393,023, filed November 18, 1953, now Patent Numbers 2,772,021 and 2,795,569, respectively. The nitrilo methylol-phosphorus polymers are cross-linked phosphorus and nitrogen containing polymers in which the recurring structural units each contains a phosphorus atom that is a component of a radical of the group $(-CH_2)_4PCl$ and $(-CH_2)_3PO$ and is linked to at least two trivalent nitrogen atoms by connecting structures of the group $-CH_2-$ and $-CH_2OCR_2-$ where R is a member of the group hydrogen and alkyl radicals.

While the nitrilo methylol-phosphorus polymers are particularly good textile flammability reducing agents, one of the objects of this invention is to modify these agents so as to increase the maximum reduction of flammability per part of impregnant.

The efficiency, i.e., the amount of flame resistance provided per unit weight of impregnant, is particularly important in connection with lightweight fabrics (i.e., fabrics weighing less than about 5 ounces per square yard) and an afterflaming phenomena which might be termed "low temperature flame propagation."

The physical properties of polymeric textile impregnating materials are different from those of a textile. Accordingly, when a textile is impregnated with a polymeric material, the changes caused in the hand, feel and the like properties of the textile increase as the amount of impregnant increases. Particularly in the case of the lightweight fabrics, when the proportions of dry nitrilo methylol-phosphorus resin impregnant is increased appreciably above about 23% by weight of the fabric, the impregnated fabrics begin to exhibit noticeable changes in hand, feel and the like. Yet, in some cases, more impregnant is necessary to keep such a lightweight fabric from propagating a flame.

In addition, particularly in the case of "napped" fabrics, fabrics having torn edges, narrow strips of fabric, or wherever there are rows of substantially individual fibers close to each other, even when the fabric is impregnated with enough nitrilo methylol-phosphorus resin to render the body of the fabric flame resistant, a flame may propagate along the rows of exposed fibers, and then die out, before the body of the fabric burns. Presumably the flame propagates along the rows of exposed fibers at a temperature lower than that which is developed when the more massive body of the fabric burns. Probably, under the right conditions, flame retarded fabrics other than napped fabrics could exhibit this low temperature flame propagation in ways other than by burning along a ragged edge or by the burning of the narrow strip.

As stated above, primary object of the present invention is to provide improved nitrilo methylol-phosphorus textile flammability reducing compositions in which the desirable properties characteristic of the nitrilo methylol-phosphorus compositions (properties such as causing only a slight reduction in hand, feel, tear strength, and the like desirable textile properties) are retained and augmented by the incorporation of halogen-free, phosphorus or sulfur containing materials that meet specified qualifications.

Patent No. 2,814,573 and application Serial No. 467,898, filed November 9, 1954, are directed to increasing the efficiency by which nitrilo methylol-phosphorus polymers impart a resistance to low temperature flame propagation by the incorporation of specified proportions of compounds that contain bromine atoms attached to carbon atoms. We have now discovered that similar increases in efficiency can be produced by the incorporation of certain halogen-free materials. This is a particularly advantageous discovery. Halogen containing compounds are notoriously susceptible to decomposition reactions that yield free halogen or a halogen acid upon exposure to radiant energy such as ultraviolet light, gamma radiation and the like. The halogen acids and the free halogens are not only reactive toward organic textiles, textile dyes, and the like, but are also toxic to humans.

In general, in accordance with this invention, organic textiles are impregnated with a mixed flame retardant consisting essentially of a nitrilo methylol-phosphorus resin mixed with from about 5 to 60 parts by weight per 100 parts by weight of resin of at least one substantially water-insoluble low-decomposition-point flame retardant which: (a) is composed of elements selected from the group consisting of carbon, nitrogen, oxygen, phosphorus and sulfur that are joined into molecules containing at least one atom of the group consisting of phosphorus and sulfur; (b) is substantially unreactive toward organic textiles and nitrilo methylol-phosphorus polymers, and is thermostable and non-volatile, at temperatures up to about 170° C.; and (c) when tested in the form of an impregnant present in about 15% by weight in an 8 oz. cotton twill, at a temperature of 315° C. in the presence of air, within one minute of exposure, decomposes and chars the cloth.

Unobviously, the operability of the low-decomposition-point flame retardants which are mixed with the nitrilo methylol-phosphorus resins is not dependent upon the molecular configurations that give rise to the usual classification of compounds as being organic, inorganic, esters, acids, imides, etc. Those flame retardants may be one or more monomeric or polymeric materials having the specified elemental composition and physical and chemical properties.

The art of imparting flame resistance to organic textiles is presently an empirical art in many respects. In many cases, while one compound is highly effective, a closely related homolog of the compound has little or no effect. While this invention is not premised upon any particular theory or explanation of why it works, the following appears to explain the phenomenon of the material increase in the flame retardant efficiency of nitrilo methylol-phosphorus polymers. In the case of cellulose and other organic textiles, the materials which impart flame resistance are compounds or polymers that decompose to produce dehydrating agents at or near the burning point of the textile. The dehydrating agent directs the decomposition of the textile to the formation of carbon and water instead of the flammable products that are formed when the untreated textile is exposed to its flaming temperature. In order for a flame-retardant to prevent the flaming of a textile, it must produce sufficient dehydrating agent to reduce the amount of flammable vapors to a concentration below their flammable limits. Flame retardants with low decomposition points cause textiles to break down (or dehydrate) at a low temperature. Some flame retardants cause cellulose, for example, to decompose at as low as 200° C. While these flame-retardants may prevent all flaming of the textile, they also limit the use of such flame-proofed textiles. Fabrics impregnated with these flame-retardants given an excessively long char length in the vertical flame test (Fed. Spec. CCC-T-191b). Textiles impregnated with flame-retardants that have very high decomposition points have very short char lengths and do not exhibit after flaming (continuing to burn after removal from an igniting flame) in the standard vertical flame test, but, may actually support a small flame when a narrow strip of the fabric is ignited with a match. The reason why such a strip supports a flame is because the flame retardant is not producing sufficient dehydrating agent at the existing temperature to reduce the concentration of the flammable products below their flammable limits.

We have discovered that the afterflaming of narrow strips of textiles flameproofed with the nitrilo methylol-phosphorus resins (which have a high decomposition point) can be substantially eliminated by the incorporation of a minor amount of flame retardant that has a low decomposition point.

The nitrilo methylol-phosphorus resins when combined with cellulose have relatively high decomposition points. They do not decompose until they have been heated at about 350° C. for about 40 seconds. When tested in the form of an impregnant present in about 15% by weight in an 8 oz. cotton twill, at a temperature of 315° C. in the presence of air, they exhibit some scorching within 60 seconds but do not undergo appreciable decomposition or char the fabric.

In contrast, various flame retardants having low decomposition points decompose and char such a cloth when heated at temperatures below 300° C. for less than 30 seconds. Narrow strips of textiles impregnated with nitrilo methylol-phosphorus resins tend to support a flame near the edges of the strip when it is held in a vertical position and ignited at the bottom. Lightweight textiles are especially susceptible to flaming under these conditions.

The textiles impregnated with the mixed flame retardants provided by this invention do not exhibit the disadvantageous low temperature flame propagation, but do retain the desirable properties characteristic of textiles flameproofed with flame retardants with high decomposition point, such as short char length in the vertical flame test and greater resistance to heat.

Illustrative examples of low-decomposition-point flame retardants which can be mixed with the nitrilo methylol-phosphorus polymers to produce the mixed flame retardants provided by this invention, include: polymers such as polyvinyl sulfone and homopolymers or copolymers of diallyl phosphate, triallyl phosphate, diallyl phosphite, diallylcyanoethyl phosphonate, substantially neutral hydrocarbon alcohol polyesters of polyphosphonitrilic halides (such as $PNCl_2)_{3-4}$ and the like); organic phosphates such as phenyl dimorpholine phosphate, tricresyl phosphate, tri(2-ethylhexyl) phosphate and the like; organic phosphine oxides such as tris(morpholino methyl) phosphine oxide, organic phosphorothioates such as di-2-triisooctyl phosphorothioate; organic thioamides such as thiourea; ammonium sulfamates such as ammonium sulfamate, sulfamic acid and the like; ammonium phosphates such as triammonium phosphate; and the like. The use of phosphorus containing polymers having the specified physical and chemical properties such as the polymers of polymerizable hydrocarbon alcohol phosphates, or the substantially neutral hydrocarbon alcohol polyesters of polyphosphonitrilic halides, is preferred.

The presence or absence of the specified physical and chemical properties in any phosphorus or sulfur containing material composed of the elements carbon, nitrogen, oxygen, phosphorus and/or sulfur can readily be determined by simple tests embodying procedures that are familiar to those skilled in the art. The term "water-insoluble" is used in the sense it is usually used in connection with qualitative organic analysis; as meaning a solubility of less than about 3 grams per 100 grams of water at 20° C. Whenever it is questionable, the reactivity toward organic textiles and nitrilo methylol-phosphorus polymers, and the thermostability and non-volatility at temperatures up to about 170° C. can be determined by any of the usual methods of measuring such properties.

Whether a given material acts as a low-decomposition-point flame retardant for organic textiles can readily be determined by the following procedure. Dissolve or dilute the material with enough inert volatile solvent to provide a readily flowable liquid. Impregnate a sample of 8 oz. cotton twill with the liquid and evaporatively free the cloth of volatile solvent, employing concentrations, wet pickup, and/or repeated impregnations and dryings, selected so that the dry cloth is impregnated with about 15% by weight of the material being tested. Place the impregnated cloth in a chamber which is maintained at a temperature of about 315° C. If the material being tested decomposes and chars the cloth within one minute of exposure, it is a low-decomposition-point flame retardant suitable for use in the present invention.

The mixed flame retardants provided by this invention can be used in the treatment of vegetable textile materials such as cotton, flax, linen, ramie, and the like; chemically modified vegetable textile materials such as cyanoethylated, carboxymethylated, aminoethylated cottons and the like; regenerated cellulosic textiles such as the viscose rayons; or proteinaceous textiles such as silk, wool, and the like. The textile materials can be treated in the form of slivers, yarns, threads, or fabrics. Polymers contained in the mixed flame retardants can be separately formed or can be produced in situ in the textile by a reaction of materials with which the textile is impregnated. The mixtures can be used as the only material with which the textile is impregnated or used in conjunction with other textile flameproofing, creaseproofing, wrinkleproofing and the like textile treating agents; or in conjunction with textile lubricants, water repellents, and the like textile treating agents.

Preferred nitrilo methylol-phosphorus polymers comprise those produced by reacting substances of the group, phosphorus compounds and polyfunctional nitrogen compounds, selected so that phosphorus contained in phosphorus compounds amounts to at least about 0.5% of the total weight of the reaction mixture and so that from about 1.0 to 5.0 parts of nitrogen contained in nitrogen groups are present per 1 part of phosphorus contained in phosphorus compounds.

While the phosphonium salt phosphorus compounds used in the production of nitrilo methylol polymer forming reactants or polymers suitable for employment in the present invention are usually used in form of phosphonium chloride, other phosphonium salts can be replaced by the analogous phosphate

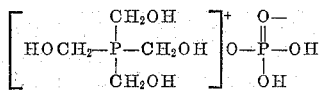

or the acetate

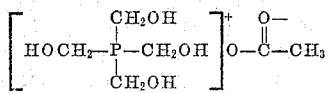

or the hydroxide

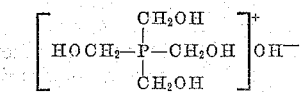

or the like phosphonium salt; and the phosphonium salt derivatives of nitrilo methylol-phosphorus resin can be replaced by the analogous phosphonium salts of acids other than hydrochloric acid.

In the process of impregnating textiles with the mixed flame retardants provided by this invention, the textile can be impregnated with the low-decomposition-point flame retardant then reimpregnated with the nitrilo methylol-phosphorus polymer or vice versa, or the low-decomposition-point flame retardant and the nitrilo methylol-phosphorus polymer can be incorporated into an organic or aqueous liquid, in the form of a solution, dispersion, emulsion or suspension, and simultaneously applied to the textile by impregnating the textile with said liquid. The later method comprises a preferred method of applying the polymeric mixtures to textiles.

In general, whether nitrilo methylol-phosphorus polymer and the low-decomposition-point flame retardant are mixed before or after application to a textile, it is preferable to apply the nitrilo methylol-phosphorus polymer to the textile in the form of either a further polymerizable polymer or a mixture of nitrilo methylol-phosphorus resin forming reactants and insolubilizing the nitrilo methylol-phosphorus polymer in situ in the textile. Textiles impregnated with a liquid containing the nitrilo methylol-phosphorus resin forming materials are preferably dried by heating them to form about 60 to 125° C. for from about 2 to 15 minutes with the lower temperature being used with the longer time, to evaporate volatile materials. The insolubilization of the nitrilo methylol-phosphorus resin forming materials can be accomplished thermally by heating the textiles containing them to a temperature of from about 125 to 160° C. for from about 2 to 15 minutes with the lower temperature being used with the longer time. Alternatively, the insolubilization can be accomplished by reacting the resin forming materials in situ in the textile with ammonia, preferably by the process described in copending application, Serial No. 393,021, filed November 18, 1953, now Patent No. 2,772,188.

The phosphorus compounds which can be used in the production of nitrilo methylol-phosphorus polymers for use in this invention comprise at least one member of the group THPC, THPO and compounds derived from either of them which contain a plurality of the methylol-phosphorus groups of the parent compounds. The derivative phosphorus compounds are the products of partially reacting THPC, THPO or a mixture thereof, with either, a mono- or polyfunctional methylol-reactive compound, i.e. continuing the reaction till some but not all of the methylol-phosphorus groups of THPC or THPO react. These compounds can be monomers in which the plurality of methylol-phosphorus groups are attached to different phosphorus atoms of the polymer molecules.

Illustrative examples of suitable polyfunctional methylol-reactive compounds which are capable of condensing with formaldehyde include: polyamines such as ethylenediamine, tetramethylenepentamine, and the like; alicyclic amines such as cyclohexylamine, cyclopentamine, methylolated cyclohexylamines, and the like; aromatic amines such as aniline, phenyldiamine, and the like; imines such as ethylenimine, and the like; amino triazines, such as, melamine; amido compounds such as guanidine, urea, and alkylated homologs and analogs, acrylamide, cyanamide, and the like; and amino acids such as glycine, lysine, arginine and the like. These compounds can either be employed as the polyfunctional nitrogen compound or as a reactant for partial reaction with THPC or THPO to produce a nitrilo group containing derivative phosphorus compound.

Other suitable nitrilo group containing derivative phosphorus compounds can be produced by a similar partial reaction of THPC, THPO, or a mixture thereof with the analogous organic nitrilo compounds which contain only one member of the group H or $CH_2OH$ attached to a trivalent nitrogen atom. Illustrative examples of such monofunctional nitrilo compounds (monofunctional in that they contain a single methylol reactive functional group) include: open chain polyamines such as N,N,N'- trimethyl ethylenediamine; alicyclic amines such as N-butyl cyclohexyl amine; aliphatic amines such as diethanolamine; amides such as N-allyl acrylamide; amino acids such as N-methyl glycine; and the bromo analogs of any such nitrilo compounds that contain at least one bromine atom attached to a carbon atom that is attached to another carbon atom.

Illustrative examples of polyfunctional methylol-reactive compounds which are capable of condensing with formaldehyde also include: phenols, naphthols and hydrocarbon-substituted phenols and naphthols such as phenol, vinylphenol, resorcinol, catechol, hydroquinone, phloroglucinol, para-tertiary-amylphenol, allylphenol, and the like.

Any of the above phenolic compounds can be partially reacted with THPC, THPO, or a mixture thereof to produce a monomeric or polymeric compound containing at least two methylol-phosphorus groups which is an aromatic group containing derivative phosphorus compound suitable for employment in the production of nitrilo methylol-phosphorus polymers.

Illustrative examples of polyfunctional methylol-reactive compounds which are capable of esterfying methyl alcohol include: saturated aliphatic polycarboxylic acids, such as oxalic, malonic, methylsuccinic, malic, tartaric, citric and like acids; unsaturated aliphatic polycarboxylic acids, such as maleic, itaconic, aconitic and like acids; alicyclic polycarboxylic acids, such as pinic, homopinic, the hexahydrophthalic and like acids; aromatic polycarboxylic acids, such as the phthalic, the benzenetricarboxylic, diphenic, chlorendic, and like acids; polycarboxylic acid anhydrides, such as succinic, maleic, phthalic, chlorendic, and the like acid anhydrides; and polycarboxylic acid halides, such as oxalyl, succinyl, the phthalyl, and the like acid halides.

Any of the above polycarboxylic acid esterifying agents or their monocarboxylic acid analogs can be partially reacted with THPC, THPO or mixtures thereof to produce monomeric or polymeric compounds containing at least two methylol-phosphorus groups to produce ester group containing derivative phosphorus compounds suitable for employment in the production of nitrilo methylol-phosphorus polymers.

The following examples are illustrative of the details of at least one method of practicing the invention.

EXAMPLE 1

*Application of phosphorus-containing compounds with low decomposition points to nitrilo methylol-phosphorus resin-treated fabric*

(A) preparation of the resin-treated fabric. Cotton twill fabric was padded in an aqueous solution containing 16.8 parts of THPC, 10.1 parts of trimethylolmelamine, 10.1 parts of urea, 4 parts of triethanolamine, and 1.0 part of a wetting agent (Triton X-100). The padding gave about a 70% wet pickup. The wet fabric was dried at 85° C. then cured by heating 5 minutes at 140° C., and finally, cured fabric was washed in cold and hot water washes. One of the washes contained about 0.1% of a detergent. The fabric, after air-drying, contained 16% resin add-on, and passed the standard vertical flame test (Fed. Spec. CCC-T-191b) with a char of about 3.5 inches. When the fabric was cut into strips about 0.5 inch wide and 5 inches long and then hung in a vertical position (180° angle position) and ignited at the bottom with a match it would burn completely. Strips of the fabric would also burn when held at about 160° angle and ignited at the bottom.

(B) Samples of fabric prepared according to A above were padded with solutions containing a flame-retardant that had a low decomposition point and then dried in an oven. The details of the treating solutions are given in Table I. In each case the degree of flame-resistance of the fabric was increased tremendously.

TABLE I

| Compound used | Concentration of compound in solution, percent | Weight add-on, percent | Flame resistance of a ½ inch x 5 inch strip when held in vertical position,[1] seconds of afterflame |
|---|---|---|---|
| Di-2-ethylhexyl hydrogen phosphites | 10 | 7.6 | 0.0 |
| Triisooctyl phosphorothioate | 10 | 6 | 0.0 |
| Triisooctyl phosphorothioate | | 2.2 | 2-5 |
| Tricresyl phosphate | 10 | 6.4 | 0-8 |
| Tri(2-ethylhexyl) phosphate | 10 | 7.4 | 1-4 |
| Phenyl dimorpholine phosphate | 6 | 2.3 | Less than 3 |
| Ammonium phosphate | 6 | 2.5 | 0.0 |
| Ammonium sulfamate | 6 | 2.5 | Less than 3 |
| Sulfamic acid | 6 | 2.5 | Less than 2 |
| Thiourea | 6 | 2.5 | 10-15 |

[1] All of these samples passed the 180° angle position in the vertical strip test.

EXAMPLE 2

*Use of triallyl phosphate*

(A) Applied on resin-treated fabric. Polytriallyl phosphate was prepared by polymerizing 125 parts of triallyl phosphate dissolved in 125 parts of 2,2-dichloroethyl ether using benzoyl peroxide as catalyst until the viscosity of the solution had increased to a point that it required four times as long to deliver 4 ml. of a solution from a pipette. The solvent was removed by extraction with petroleum ether and the polymer was dried. The above-prepared polytriallyl phosphate was dissolved in a mixture of 50 parts (by volume) of methanol and 50 parts of ethylene dichloride and then padded onto the resin-treated fabric prepared according to Example 1A. After the fabric samples were padded, they were dried at 60° C. for 15 minutes and then washed in hot tap water containing about 0.1% Gardinal LS and then rinsed and dried. The flame-resistance of the fabrics were determined and are summarized in Table II.

TABLE II

| Sample No. | Polytriallyl phosphate in solution, percent | Wet pickup of the fabric, percent | Flame resistance of a ½ inch x 5 inch strip when held in vertical position, seconds of afterflame | Char length (Fed. Spec. CCC-T-191b), inches |
|---|---|---|---|---|
| A | 15.3 | 36 | 0.0 | 3.1 |
| B | 13.5 | 34 | 0.0 | 3.4 |
| C | 7.7 | 30 | 0.0 | 3.1 |
| D | 4.6 | 25 | 5-10 | 3.4 |
| Control (methylol-phosphorus resin only) | 0.0 | | ([1]) | 3.5 |

[1] Burn completely.

(B) Applied from emulsion with nitrilo methylol-phosphorus resin-forming materials. Polytriallyl phosphate was dissolved in methanol-ethylene dichloride as described above and then emulsified in a dilute solution of polyvinyl alcohol (about 2% polyvinyl alcohol in water). This emulsion was compatible with the nitrilo methylol-phosphorus resin-forming solutions and when combined with them formed a stable emulsion. Stable emulsions which contained various amounts of the resin-forming materials and polytriallyl phosphate were padded on fabric, then dried at about 90° C. then cured by heating 5 minutes at 140° C., washed and air dried. The fabrics which contained the resin plus the polytriallyl phosphate were extremely resistant to flaming and yet had a short char length which is characteristic of a flame-retardant with high decomposition points. Details of the composition of the emulsions and test results of treated fabrics are shown in Table III.

TABLE III.—EMULSION APPLICATION OF FLAME-RETARDANTS TO FABRIC

| Emulsion composition | | | | | | | Wet pick-up, percent | Resin add-on, percent | Duration of after-flaming of a ½ inch strip in 180° angle, seconds | Char length in vertical flame test, inches |
| --- | --- | --- | --- | --- | --- | --- | --- | --- | --- | --- |
| THPC, percent | Trimethylolmelamine, percent | Urea, percent | TEA,[1] percent | Sapamine WL,[2] percent | PVA,[3] percent | Polytriallyl phosphate, percent | | | | |
| 14.4 | 8.3 | 8.6 | 2.9 | 1.2 | 0.47 | 0.0 | 63 | 16 | ([4]) | 3.8 |
| 14.4 | 8.3 | 8.6 | 2.9 | 1.2 | 0.47 | 6.4 | 66 | 16.9 | 2–3 | 3.2 |
| 12.6 | 7.3 | 7.6 | 2.5 | 1.2 | 0.56 | 6.4 | 59 | 20 | 4–5 | 4.1 |
| 10.6 | 6.1 | 6.3 | 2.1 | 0.9 | 0.35 | 9.2 | 53 | 23 | 0–2 | 3.8 |

[1] TEA=Triethanolamine.
[2] A textile softener.
[3] PVA=Polyvinyl alcohol (this was first dissolved in water, then added to the resin-forming solution).
[4] Burn completely.

EXAMPLE 3

Use of diallyl phosphonitrilate

The diallyl ester of phosphonitrilic chloride (for convenience referred to as PNE) made by reacting sodium allylate with $(PNCL_2)_x$ (where $x$ is usually 3 or 4 but may be much larger) was used in combination with nitrilo methylol-phosphorus resin flame-retardants. It was applied as a second treatment on top of the resin and also along with the resin flame-retardant in a single application.

To illustrate the two-treatment application, a sample of a resin treated 8 oz. cotton fabric containing 13.8% resin add-on was prepared under conditions similar to those described in part "A" of Example 1. The fabric was then padded in an emulsion containing 38 parts of PNE, 1.24 parts of polyvinyl alcohol and 61 parts of water, then dried at 90° C. and cured at 140° C. for 6 minutes. After washing and air drying the fabric contained a total of 25% resin. The fabric would not support a flame in the 180° angle.

To illustrate the single treatment process the following experiment is cited: An emulsion was prepared by mixing 80 parts of an aqueous solution containing 19.4% of THPC, 12.5% of trimethylolmelamine, 12.5% of urea and 3.4% of triethanolamine with 20 parts of an aqueous emulsion containing 31% of poly PNE, 1.25% of polyvinyl alcohol. (The poly PNE was made by emulsion polymerization of PNE using a peroxide catalyst. The PNE was polymerized at 80° C. using 2% polyvinyl alcohol as emulsifying agent until the rate of flow of the emulsion through a pipette had increased fourfold.) Fabric samples (8 oz. twill and 8 oz. sateen) were padded in the final emulsion to a wet pickup of 60%, then dried at 85° C. and cured 6 minutes at 140° C. and then washed in hot water and air dried. Both fabrics contained a total of 13.4% resin add-on and ½ inch strips of these fabrics would not support a flame when held in the vertical position and ignited at the bottom. Similar fabric samples which contained 13.8% of nitrilo methylol-phosphorus resin alone burned completely in the vertical position.

EXAMPLE 4

Use of diallylcyanoethylphosphonate

Diallylcyanoethylphosphonate (for convenience referred to as DCP) was made by reacting acrylonitrile with diallylphosphite. A 20% solution of DCP was made in an ethylene chloride-methanol azeotrope and polymerized with a peroxide catalyst at about 80° C. until the rate of flow of the solution through a pipette had increased about fourfold (the DCP may also be emulsion polymerized using about 2% polyvinyl alcohol as the emulsifying agent).

A sample of a resin treated 8 oz. cotton fabric containing 13.8% resin add-on was prepared under conditions similar to those described in part "A" of Example 1. The fabric was then padded in an 8% solution of poly DCP, dried at 80–90° C., then heated for 5 minutes at 140° C. The fabric had a total resin add-on of 18% and was highly flame-resistant.

We claim:

1. A flame resistant organic textile comprising an organic textile impregnated with a mixed flame retardant comprising a nitrilo methylol-phosphorus polymer mixed with about from 5 to 60 parts by weight per 100 parts by weight of said polymer of at least one substantially water-insoluble low-decomposition-point flame retardant compound selected from the group consisting of a polyalkene phosphate, a polyalkene phosphonitrilate, a polyalkene cyanoethylphosphonate, an aryl phosphate, an alkyl phosphorothioate, a polyvinyl sulfone, and an alkyl thioamide, said nitrilo methylol-phosphorus polymer having been obtained by heating a phosphorus compound from the group consisting of tetrakis (hydroxymethyl) phosphonium chloride, tris (hydroxymethyl) phosphine oxide, and mixtures thereof with monomeric compounds having at least two members of the group consisting of hydrogen atoms and methylol (—$CH_2OH$) radicals attached to trivalent nitrogen atoms.

2. The textile of claim 1 in which the water-insoluble low-decomposition-point flame retardant with which the nitrilo methylol-phosphorus resin is mixed is polytriallyl phosphate.

3. The textile of claim 1 in which the water-insoluble low-decomposition-point flame retardant with which the nitrilo methylol-phosphorus resin is mixed is a substantially neutral allyl polyester of a polyphosphonitrilic halide.

4. The textile of claim 1 in which the water-insoluble low-decomposition-point flame retardant with which the nitrilo methylol-phosphorus resin is mixed is poly diallylcyanoethylphosphonate.

5. A composition for rendering organic textiles flame resistant comprising an aqueous liquid containing a mixture of the polymer-forming components of at least one nitrilo methylol-phosphorus polymer and from 5 to 60 parts by weight per 100 parts by weight of said polymer-forming components of at least one substantially water-insoluble low-decomposition-point flame retardant compound selected from the group consisting of a polyalkene phosphate, a polyalkene phosphonitrilate, a polyalkene cyanoethylphosphonate, an aryl phosphate, an alkyl phosphorothioate, a polyvinyl sulfone, and an alkyl thioamide, said nitrilo methylol-phosphorus polymer having been obtained by heating a phosphorus compound from the group consisting of tetrakis (hydroxymethyl) phosphonium chloride, tris (hydroxymethyl) phosphine oxide, and mixtures thereof with monomeric compounds having at least two members of the group consisting of hydrogen atoms and methylol (—$CH_2OH$) radicals attached to trivalent nitrogen atoms.

6. The composition of claim 5 in which the flame retardant mixed with the nitrilo methylol-phosphorus polymer-forming components is a polytriallyl phosphate.

7. The composition of claim 5 in which the flame retardant mixed with the nitrilo methylol-phosphorus polymer-forming components is a polydiallylcyanoethylphosphonate.

8. The composition of claim 5 in which the flame retardant mixed with the nitrilo methylol-phosphorus polymer-forming components is a substantially neutral allyl polyester of a phosphonitrilic halide.

9. The process of increasing the resistance of an organic textile to low temperature flame propagation which comprises impregnating said textile with a nitrilo methylolphosphorus polymer and with about from 5 to 60 parts by weight per 100 parts by weight of said polymer of at least one substantially water-insoluble low-decomposition-point flame retardant compound selected from the group consisting of a polyalkene phosphate, a polyalkene phosphonitrilate, a polyalkene cyanoethylphosphonate, an aryl phosphate, an alkyl phosphorothioate, a polyvinyl sulfone, and an alkyl thioamide, said nitrilo methylolphosphorus polymer having been obtained by heating a phosphorus compound from the group consisting of tetrakis (hydroxymethyl) phosphonium chloride, tris (hydroxymethyl) phosphine oxide, and mixtures thereof with monomeric compounds having at least two members of the group consisting of hydrogen atoms and methylol ($-CH_2OH$) radicals attached to trivalent nitrogen atoms.

10. The process of claim 9 in which the water-insoluble low-decomposition-point flame retardant with which the textile is impregnated is polytriallyl phosphate.

11. The process of claim 9 in which the water-insoluble low-decomposition-point flame retardant with which the textile is impregnated is poly diallylcyanoethylphosphonate.

12. The process of claim 9 in which the water-insoluble low-decomposition-point flame retardant with which the textile is impregnated is a substantially neutral allyl polyester of a phosphonitrilic halide.

References Cited in the file of this patent

UNITED STATES PATENTS

| | | |
|---|---|---|
| 2,464,342 | Pollak et al. | Mar. 15, 1949 |
| 2,660,543 | Walter et al. | Nov. 24, 1953 |
| 2,668,096 | Reeves et al. | Feb. 2, 1954 |